(12) United States Patent
Cha et al.

(10) Patent No.: US 10,804,047 B2
(45) Date of Patent: Oct. 13, 2020

(54) MOBILE TERMINAL

(71) Applicant: LG ELECTRONICS INC., Seoul (KR)

(72) Inventors: Youngdo Cha, Seoul (KR); Hyunsu Song, Seoul (KR); Bonghyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 116 days.

(21) Appl. No.: 16/310,393

(22) PCT Filed: Jun. 29, 2016

(86) PCT No.: PCT/KR2016/006986
§ 371 (c)(1),
(2) Date: Dec. 14, 2018

(87) PCT Pub. No.: WO2017/217579
PCT Pub. Date: Dec. 21, 2017

(65) Prior Publication Data
US 2019/0259551 A1    Aug. 22, 2019

(30) Foreign Application Priority Data

Jun. 17, 2016  (KR) .................. 10-2016-0075972

(51) Int. Cl.
*H01R 13/52* (2006.01)
*H01H 13/06* (2006.01)
(Continued)

(52) U.S. Cl.
CPC .............. *H01H 13/06* (2013.01); *H01H 9/04* (2013.01); *H01R 13/5202* (2013.01);
(Continued)

(58) Field of Classification Search
CPC .. H01R 13/5202; H01R 13/521; H01H 13/06; H01H 9/04; H04M 1/02; H04M 1/18; H04B 1/3827
(Continued)

(56) References Cited

U.S. PATENT DOCUMENTS 7,598,465 B2 * 10/2009 Hirabayashi ........... G03B 17/08
                                                          200/302.1
8,089,017 B2 *  1/2012 Chen .................... G06F 3/0488
                                                          200/302.2
(Continued)

FOREIGN PATENT DOCUMENTS

KR    20110095063    8/2011
KR    20130028503    3/2013
(Continued)

OTHER PUBLICATIONS

PCT International Application No. PCT/KR2016/006986, International Search Report dated Mar. 16, 2017, 2 pages.

*Primary Examiner* — Khiem M Nguyen
(74) *Attorney, Agent, or Firm* — Lee, Hong, Degerman, Kang & Waimey

(57) ABSTRACT

The mobile terminal is disclosed. The mobile terminal of the present invention may include a display unit, a body, a first signal unit, a second signal unit, and a signal connection module. The signal connection module may be disposed in a hole formed in the body to shield the hole. The signal connection module may electrically connect the first signal unit and the second signal unit. The first signal unit may be various circuit boards. The second signal unit may have a function of receiving an input or an antenna function.

15 Claims, 14 Drawing Sheets

(51) Int. Cl.
*H01H 9/04* (2006.01)
*H04B 1/3827* (2015.01)
*H04M 1/18* (2006.01)
*H04M 1/02* (2006.01)
*H04B 1/38* (2015.01)

(52) U.S. Cl.
CPC ............ *H04B 1/3827* (2013.01); *H04M 1/02* (2013.01); *H04M 1/18* (2013.01); *H04B 2001/3894* (2013.01)

(58) Field of Classification Search
USPC .................................................. 439/271, 578
See application file for complete search history.

(56) References Cited

U.S. PATENT DOCUMENTS

| | | | |
|---|---|---|---|
| 8,158,899 B2 * | 4/2012 | Bloch .................... | H01H 13/86 200/302.2 |
| 8,378,244 B2 * | 2/2013 | Xiao ..................... | H04M 1/236 200/302.2 |
| 9,625,944 B2 * | 4/2017 | Weber ................... | G06F 1/1656 |
| 9,627,797 B2 * | 4/2017 | Song ................... | H01R 13/5213 |
| 2007/0034493 A1 | 2/2007 | Kawasaki et al. | |

FOREIGN PATENT DOCUMENTS

| KR | 20140068388 | 6/2014 |
|---|---|---|
| KR | 20160034744 | 3/2016 |

* cited by examiner

【Figure 1】
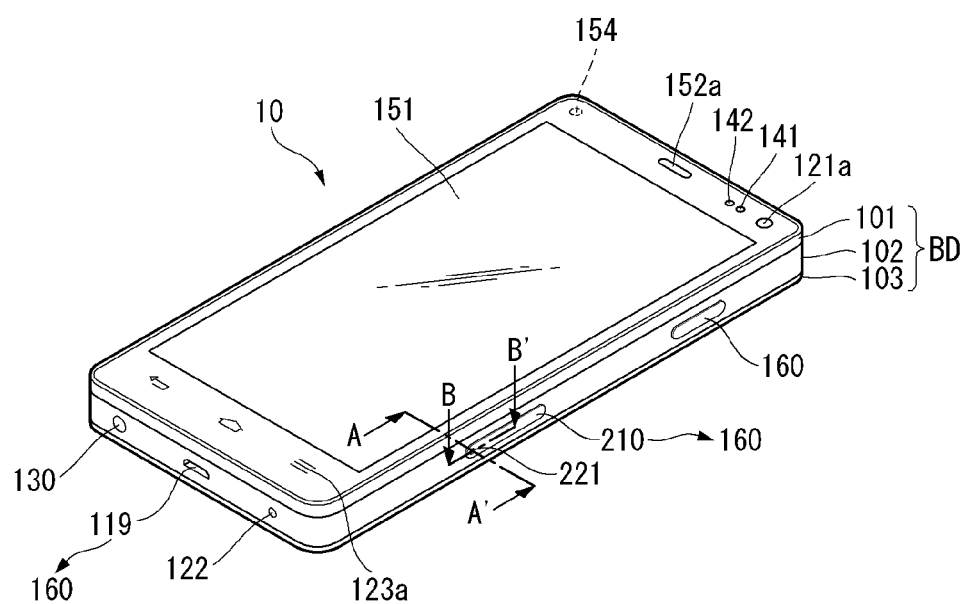

【Figure 2】
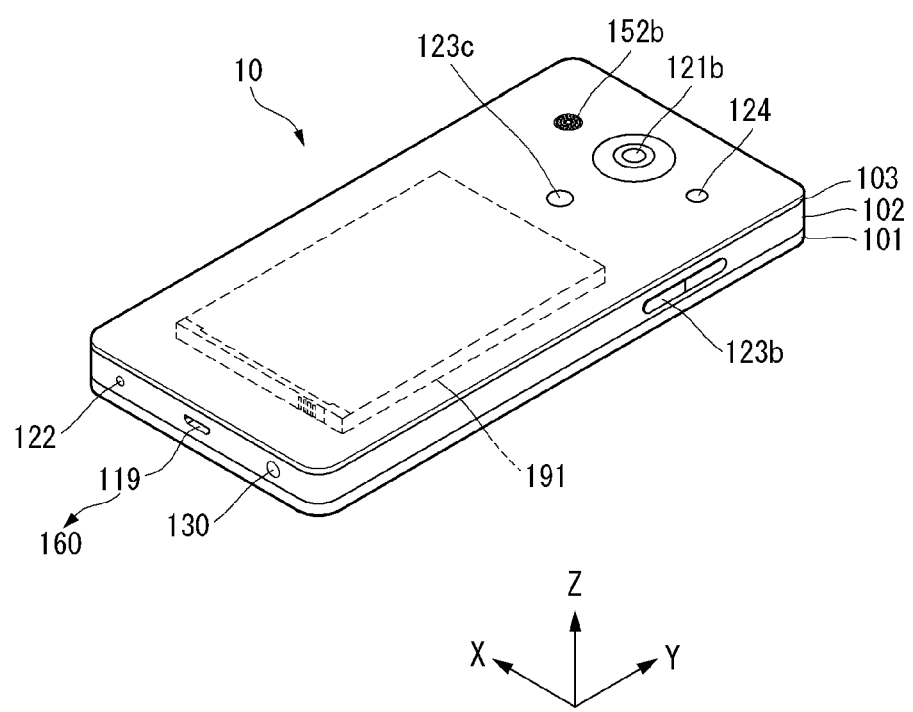

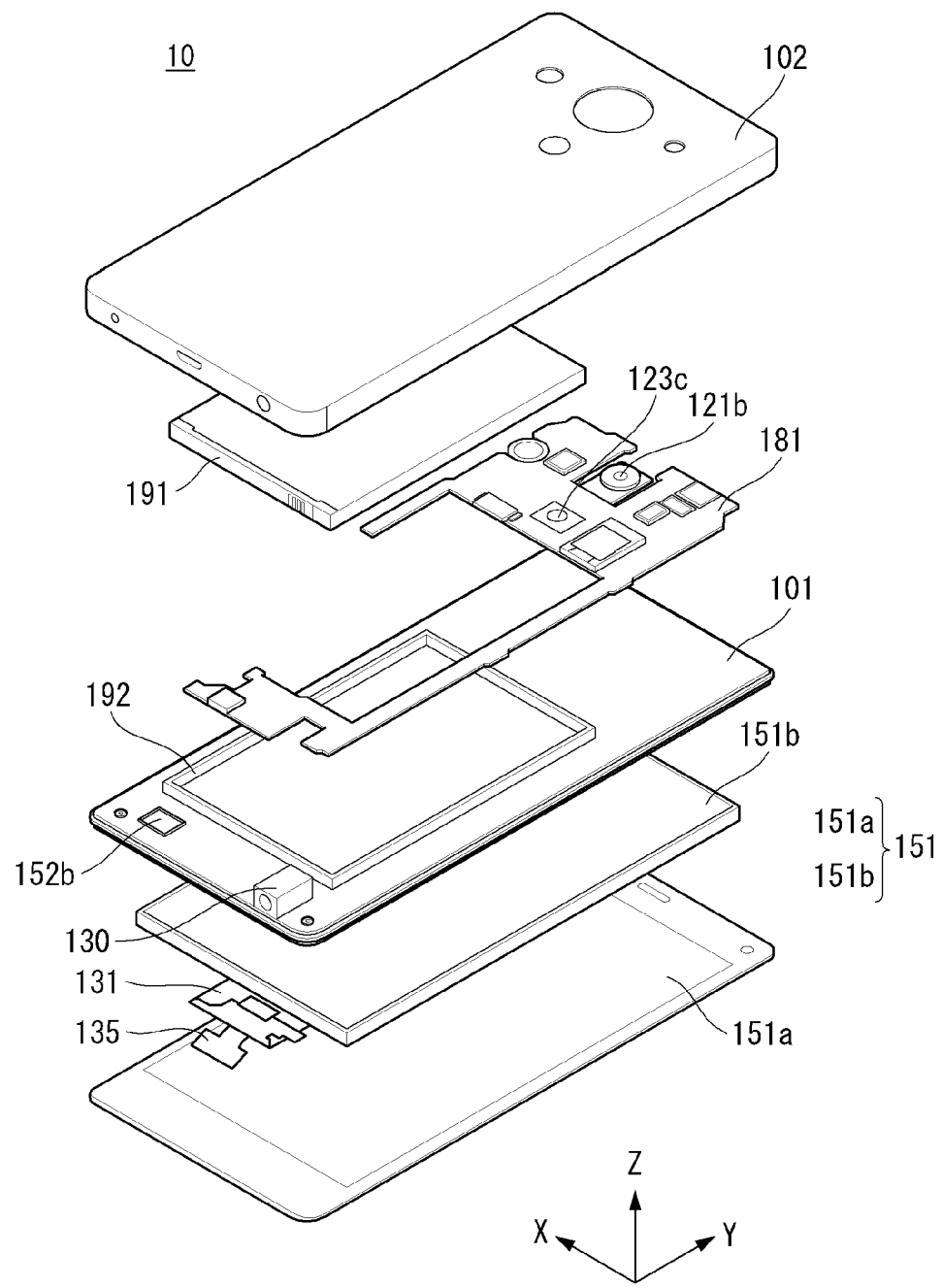
[Figure 3]

【Figure 4】
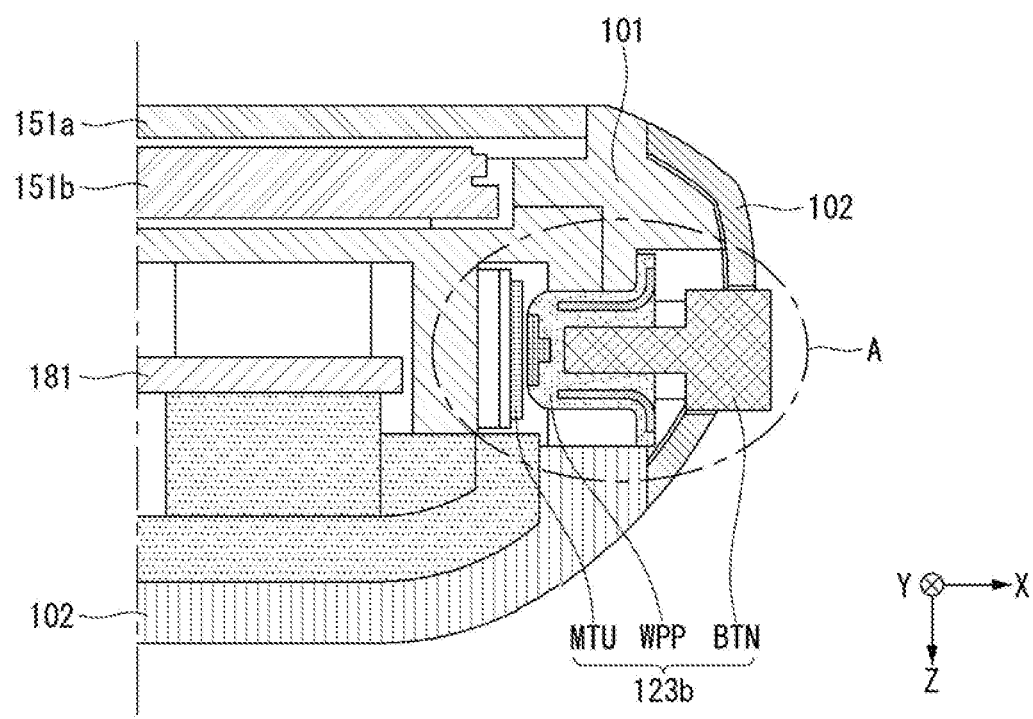

【Figure 5】
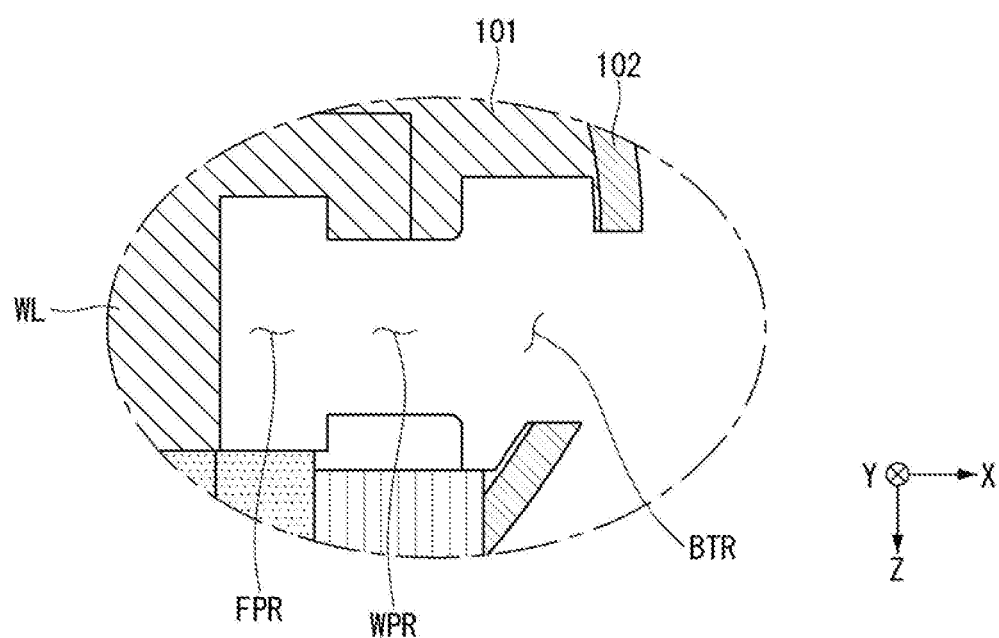

[Figure 6]
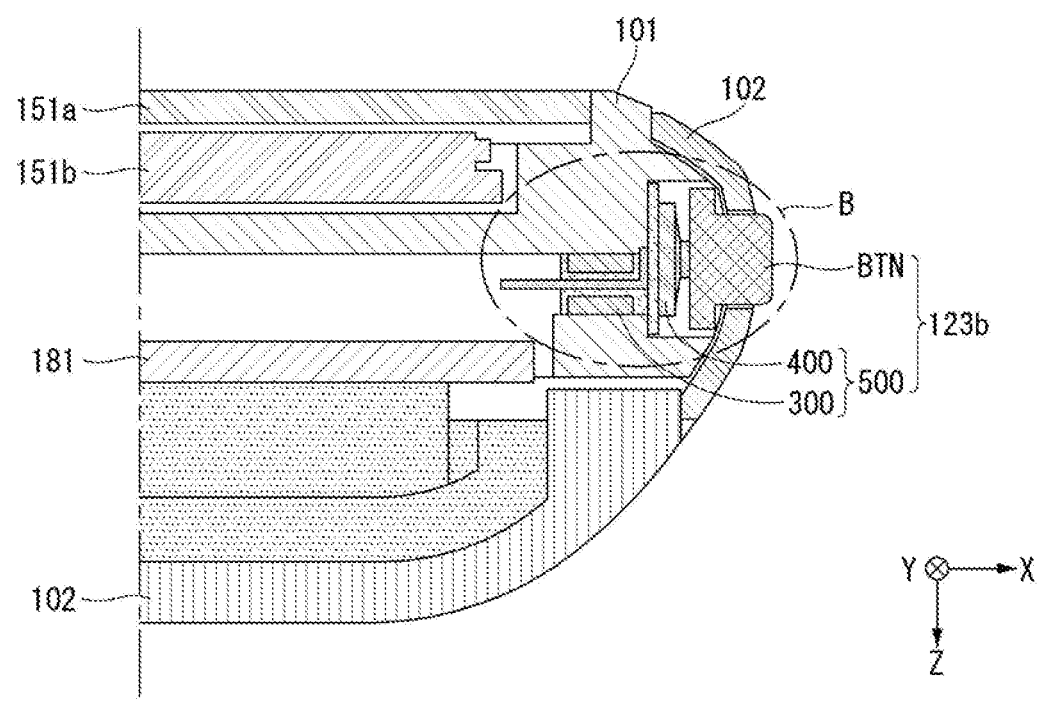
[Figure 7]
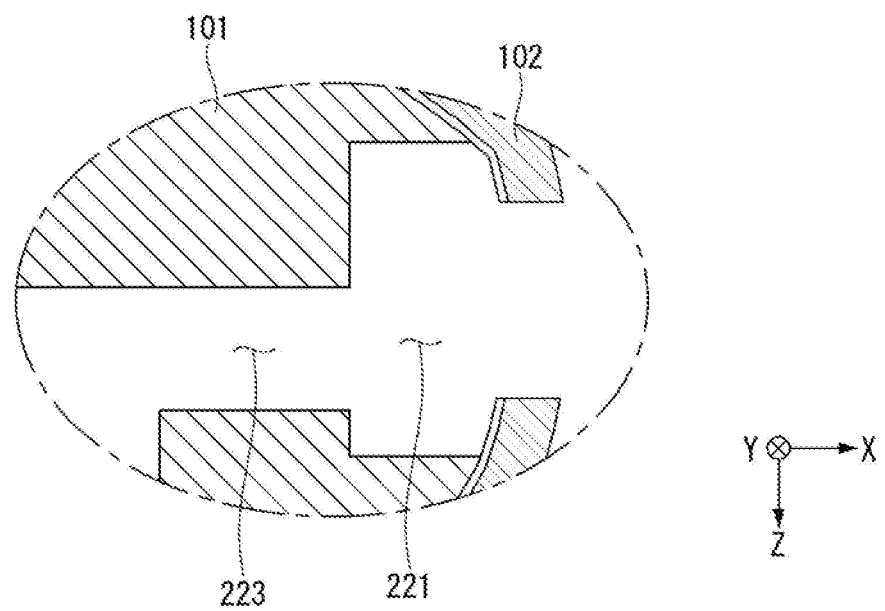

[Figure 8]
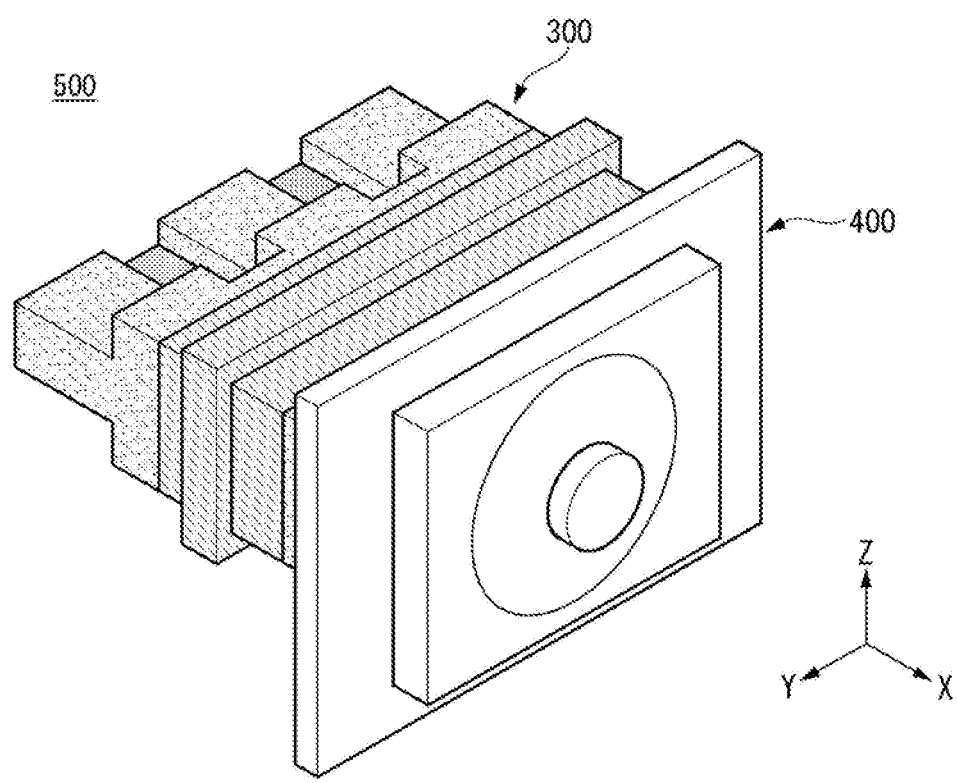

【Figure 9】
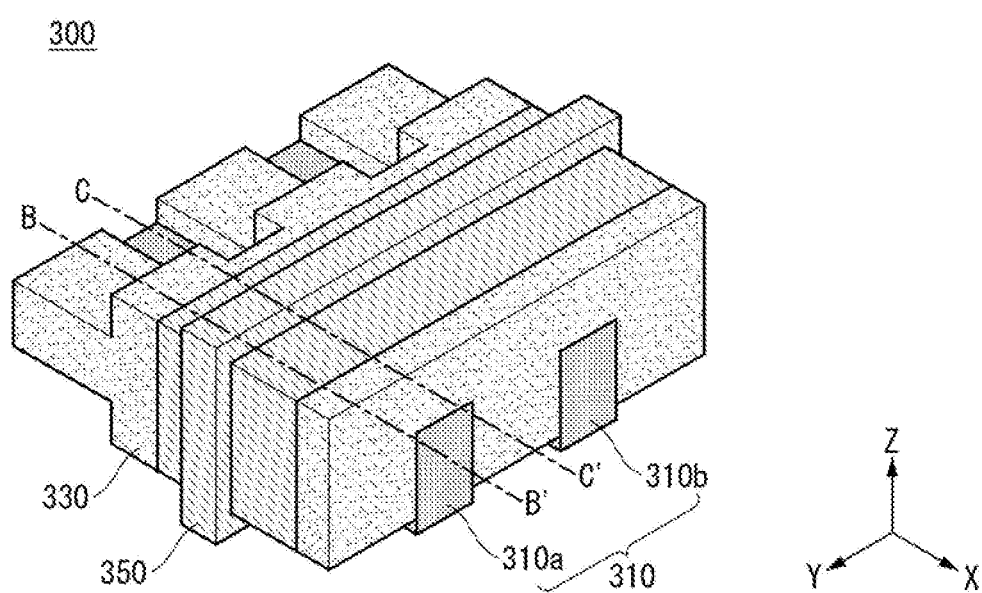

【Figure 10】
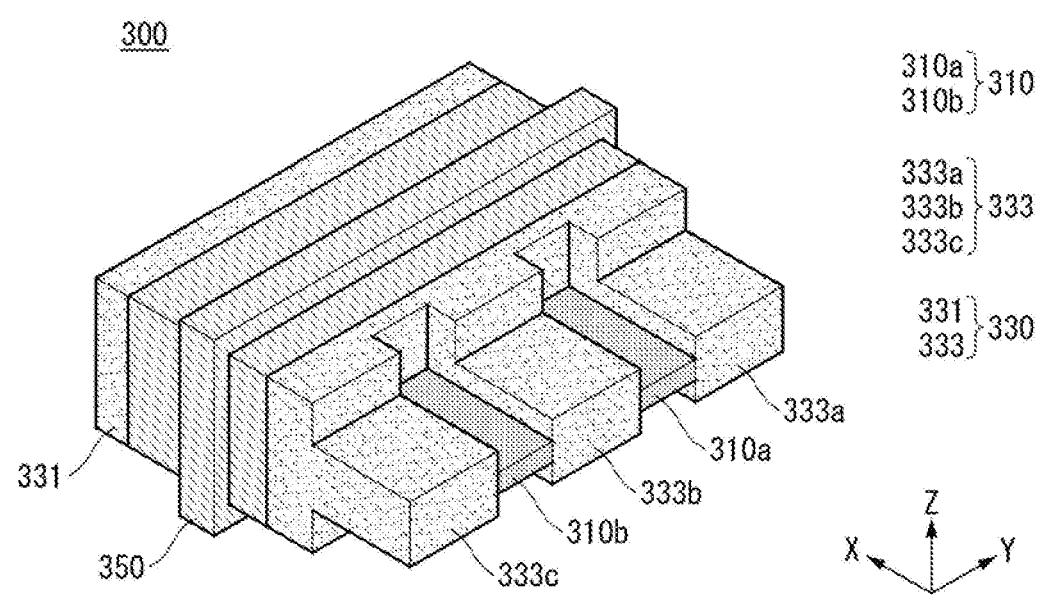

[Figure 11]
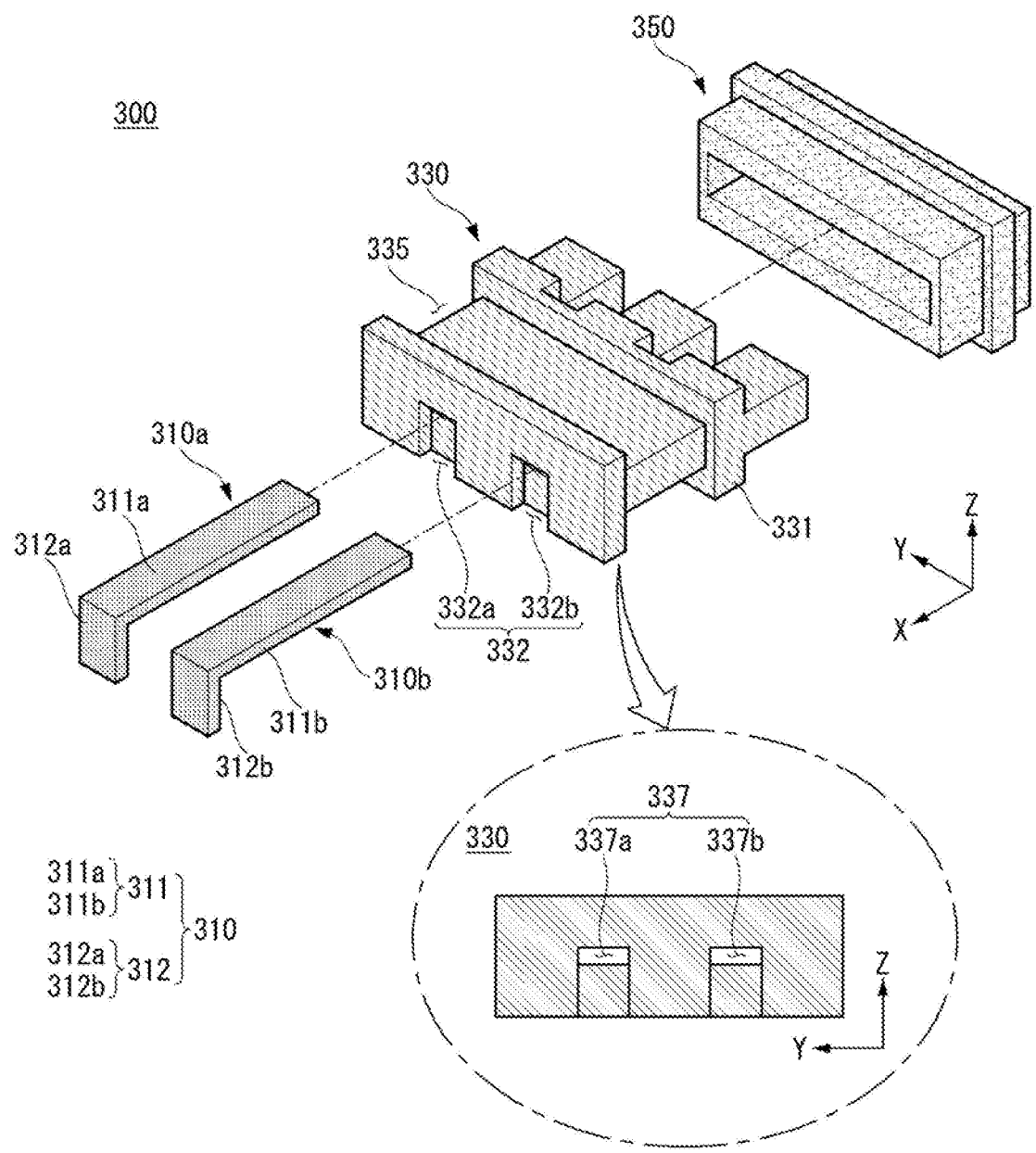

[Figure 12]
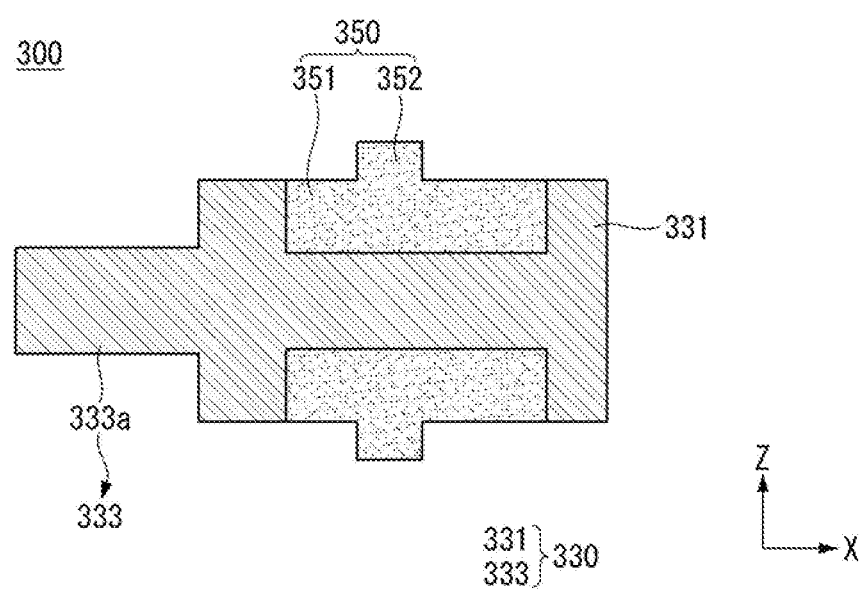

【Figure 13】
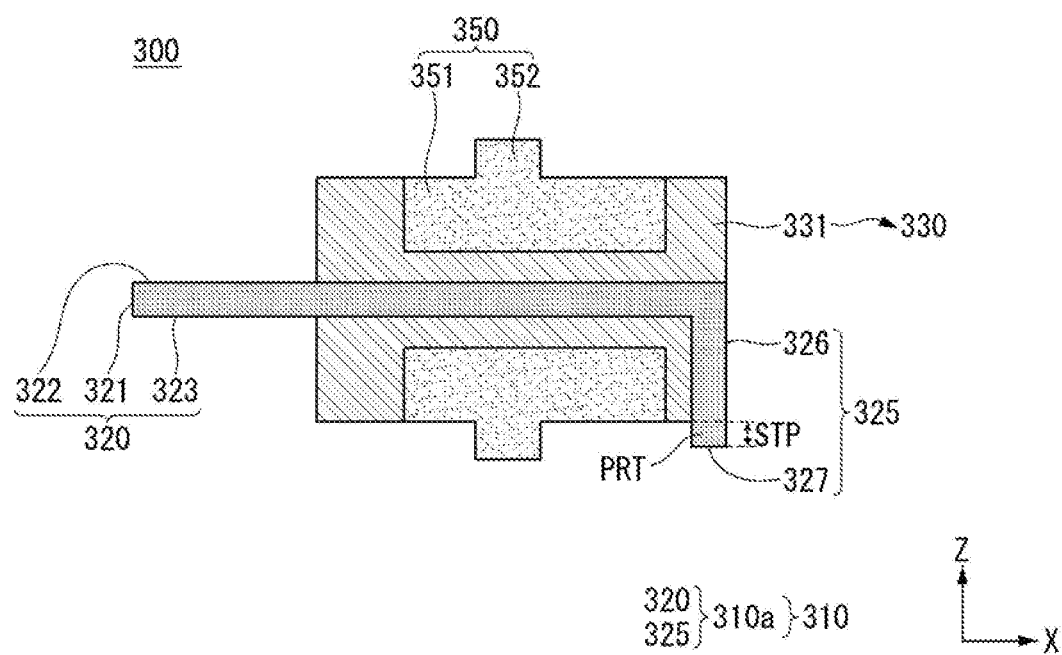

【Figure 14】
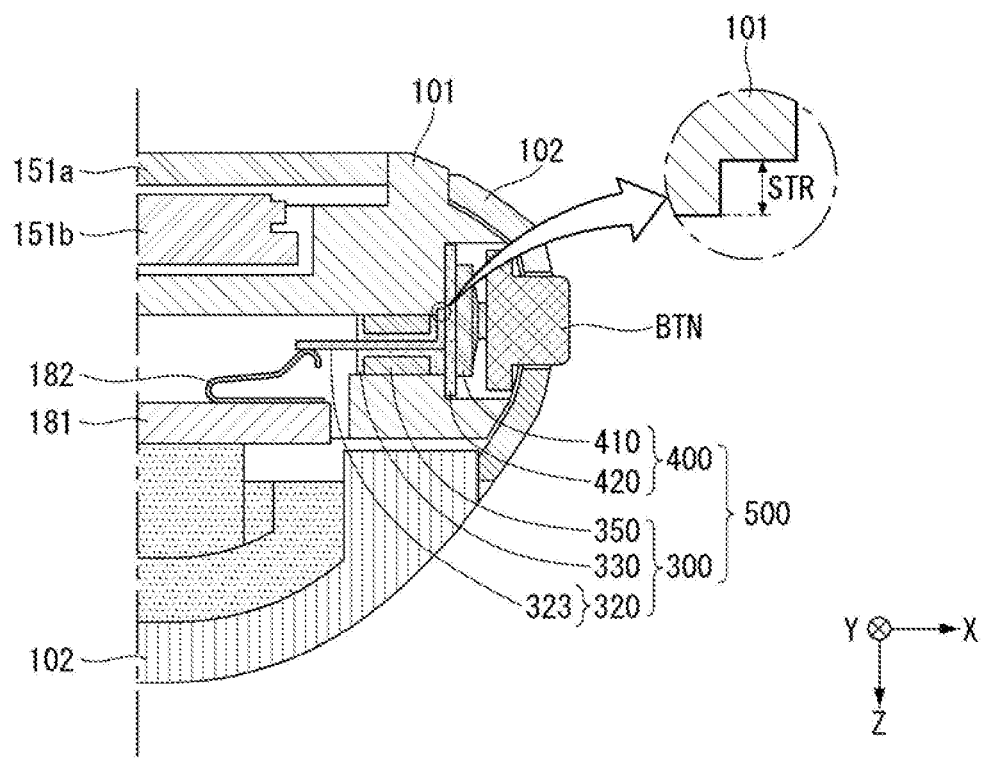

[Figure 15]
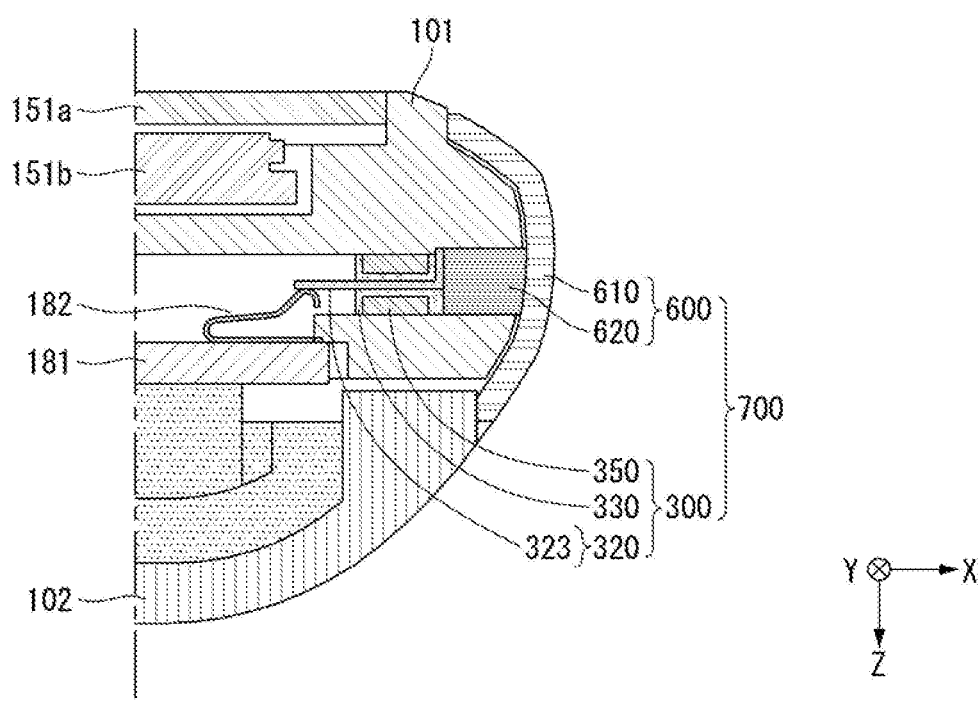

MOBILE TERMINAL

CROSS-REFERENCE TO RELATED APPLICATIONS

This application is the National Stage filing under 35 U.S.C. 371 of International Application No. PCT/KR2016/006986, filed on Jun. 29, 2016, which claims the benefit of earlier filing date and right of priority to Korean Application No. 10-2016-0075972, filed on Jun. 17, 2016, the contents of which are all hereby incorporated by reference herein in their entirety.

TECHNICAL FIELD

The present invention relates to a mobile terminal. More specifically, the present invention relates to a mobile terminal for transmitting an electric signal between two elements, which waterproof a hole formed in a body and sandwich the hole.

BACKGROUND ART

A terminal may be categorized into a mobile/portable terminal or a stationary terminal depending on whether the terminal is movable. The mobile terminal may be categorized into a handheld terminal or a vehicle mounted terminal according to whether the user may carry the mobile phone directly.

The functions of mobile terminals have been diversified. For example, the functions of mobile terminals are: communication of data and voice, photographing and video shooting through a camera, voice recording, music file playback through a speaker system, and outputting an image or video to a display unit. Some mobile terminals are equipped with an electronic game play function or a multimedia player function. In particular, mobile terminals may receive multicast signals that provide visual content such as broadcast and video or television programs.

Such a terminal has been a multimedia player having a complex function such as photographing or video shooting, playback of music or video file.

For supporting and increasing the functionality of such terminals, it is contemplated to improve the structural and/or software aspects of the terminal.

According to the demand for the waterproof function of the mobile terminal, a waterproof function for the outer configuration of the mobile terminal can be considered. In particular, a configuration for a waterproof function for a hole formed in a mobile terminal can be applied to a mobile terminal.

DISCLOSURE

Technical Problem

The present invention is directed to solving the above-mentioned problems and other problems. Another object of the present invention is to provide a mobile terminal that transmits an electric signal between two constituent elements having a hole formed in a body and having a waterproof structure therebetween.

Technical Solution

According to an aspect of the present invention, a mobile terminal, comprising: a body having a hole shaped body hole; a display unit disposed on a front surface of the body; a first signal unit located at one side of the body hole and processing an electric signal; a second signal unit located on the other side of the body hole; and a signal connection module disposed in the body hole to shield the body hole and electrically connect the first signal unit and the second signal unit, wherein the signal connection module comprises: a signal connection unit electrically connecting the first signal unit and the second signal unit; a housing disposed in the body hole to surround and support at least part of the signal connection unit; and a waterproof packing mounted on one side of the housing to shield the body hole.

Wherein the signal connection unit may be provided in plurality, wherein the plurality of signal connection units may be electrically insulated by the housing.

Wherein the housing may include a housing body, at least a portion of the housing body being electrically non-conductive; and a housing lid extending in one direction from one side of the housing body.

Wherein the housing lid may be formed of a plurality of but spaced apart from each other, wherein the signal connection unit may be located between two adjacent housing lids of the plurality of housing lids.

Wherein the signal connection unit may include a signal connection body; and a signal connection bending part extending from one side of the signal connection unit body and formed to be bent.

Wherein the housing further may comprise a housing hollow having a hole shape and formed at one side of the housing body to accommodate a part of the signal connection body.

Wherein the housing may further comprise a housing well formed in a concave shape on an outer surface of the housing body adjacent to the signal connection bending part and communicating with the housing hollow part to accommodate a part of the signal connection bending part.

Wherein the housing well may have a depth corresponding to the thickness of the signal connection bending part.

Wherein the signal connection bending part may comprise a protruding part protruding from the outer side surface of the housing body in an extending direction of the signal connection bending part.

Wherein the body may form a stopper region having a concave shape corresponding to the shape of the protruding part, the stopper region being adjacent to the body hole.

Wherein the signal connection body may form a first signal connection terminal electrically connected to the first signal unit on one side of the signal connection body, wherein the first signal connection terminal may form a plurality of surfaces exposed to the outside, wherein the signal connection bending part may form a second signal connection terminal electrically connected to the second signal unit on one side of the signal connection bending part, wherein the second signal connection terminal may form a plurality of surfaces exposed to the outside.

Wherein the first signal connection terminal may be contacted to the first signal unit and is electrically connected to the first signal unit, wherein the second signal connection terminal may be fixed to the second signal unit and is electrically connected to the second signal unit.

Wherein the first signal unit may comprise at least one of a main circuit board, a touch circuit board, and a display circuit board.

Wherein the second signal unit may be at least one of an input receiving unit and an antenna unit.

Wherein the antenna unit may comprise an antenna transceiver forming form at least part of an outer surface of the body, and converting an electric signal and an electromagnetic wave into each other, and an antenna connection unit connecting the antenna transceiver and the signal connection unit.

Advantageous Effects

According to at least one of the embodiments of the present invention, a hole formed in the body of the mobile terminal can be sealed.

According to at least one of the embodiments of the present invention, it is possible to easily transmit an electric signal between the two components sandwiching the hole.

It should be understood, however, that the detailed description and specific examples, such as the preferred embodiments of the invention, are given by way of illustration only, since various changes and modifications within the spirit and scope of the invention will be apparent to those skilled in the art.

DESCRIPTION OF DRAWINGS

FIGS. 1 and 2 are conceptual diagrams viewing a mobile terminal according to an embodiment of the present invention in different directions.

FIG. 3 is an exploded perspective view of the mobile terminal of FIG. 1.

FIGS. 4 and 5 are cross-sectional views of the mobile terminal taken along line A-A' of FIG. 1, illustrating a mobile terminal to which a conventional waterproof member is applied.

FIGS. 6 and 7 are cross-sectional views of the mobile terminal of FIG. 1 taken along line A-A', illustrating a mobile terminal to which an input receiving module according to an embodiment of the present invention is applied FIG. 8 is a diagram illustrating the input receiving module of FIG. 6.

FIGS. 9 to 11 are diagrams illustrating the signal connection module of FIG. 8.

FIG. 12 is a cross-sectional view of the signal connection module 300 taken along line B-B' in FIG. 9.

FIG. 13 is a cross-sectional view of the signal connection module taken along line C-C' of FIG. 9.

FIG. 14 is a diagram illustrating a state in which the signal connection module of FIG. 6 is electrically connected to the first signal portion.

FIG. 15 is a view illustrating a state in which the signal connection module 300 and the antenna unit are connected.

MODE FOR INVENTION

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression may include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

The mobile terminal described in this specification includes a mobile phone, a smart phone, a laptop computer, a digital broadcasting terminal, a personal digital assistant (PDA), a portable multimedia player (PMP), a slate PC, a tablet PC, an ultrabook, and a wearable device (such as a smartwatch, a smart glass, and a head mounted display (HMD)).

However, it could be understood by those skilled in the art that the configuration according to the embodiments described herein may be applied to fixed terminals such as a digital TV, a desktop computer, a digital signage, and the like.

The coordinate system used in the present specification is a Cartesian coordinate system as an orthogonal coordinate system. For example, the coordinate system used in this specification is an XYZ coordinate system. In this specification, the XYZ coordinate system is the left handed direction. In other words, when index finger to little finger of the left hand are wound from the X axis to the Y axis, the direction indicated by the thumb becomes the Z axis.

FIGS. 1 and 2 are conceptual diagrams viewing a mobile terminal according to an embodiment of the present invention in different directions.

Referring to FIGS. 1 and 2, the disclosed mobile terminal 10 includes a bar-shaped body. However, the present invention is not limited thereto, and may be applied to various structures such as a watch type, a clip type, or a glass type. The present invention may be applied various structures in which two or more bodies are movably coupled, such as a folder type, a flip type, a slide type, a swing type, and a swivel type. A description of a particular type of mobile terminal, although relevant to a particular type of mobile terminal, is generally applicable to other types of mobile terminals.

Here, the body of the terminal may be understood as a concept of referring to the mobile terminal 10 as at least one aggregate.

The mobile terminal 10 may include a case (for example, a frame, a housing, a cover, etc.) which forms an appearance. As shown, the mobile terminal 10 may include a front case 101 and a rear case 102. Various electronic components are disposed in the inner space formed by the front case 101 and the rear case 102. At least one middle case may be additionally disposed between the front case 101 and the rear case 102.

A display unit 151 may be disposed on a front surface of the terminal body to output information. The window 151a of the display unit 151 may be mounted on the front case 101 to form a front surface of the terminal body together with the front case 101.

In some cases, electronic components may also be mounted on the rear case 102. The electronic components that are available to be mounted on the rear case 102 include a detachable battery, an identification module, a memory card, and the like. In this case, a rear cover 103 for covering the mounted electronic component may be detachably coupled to the rear case 102. Therefore, when the rear cover 103 is separated from the rear case 102, the electronic components mounted on the rear case 102 may be exposed to the outside.

When the rear cover 103 is coupled to the rear case 102, a lateral part of the rear case 102 may be exposed. In some cases, the rear case 102 may be completely covered by the rear cover 103, when the rear case 102 and the rear cover 103 are coupled. Meanwhile, the rear cover 103 may be provided with an opening for exposing the camera 121b and the sound output unit 152b.

These cases 101, 102, and 103 may be formed by injection molding of synthetic resin or may be formed of metal such as stainless steel (STS), aluminum (Al), titanium (Ti), or the like.

The mobile terminal 10 may be configured such that one case provides the inner space, unlike the above example in which a plurality of cases provide an inner space for accommodating various electronic components. In this case, a mobile terminal 10 may have an unibody in which a synthetic resin or a metal is connected from the lateral to the rear.

Meanwhile, the mobile terminal 10 may include a waterproof unit (not shown) for preventing water from penetrating into the terminal body. For example, the waterproof unit may be provided with a waterproof member between the window 151a and the front case 101, between the front case 101 and the rear case 102, or between the rear case 102 and the rear cover 103. The waterproof member may seal an inner space formed between them.

The mobile terminal 10 may include the display unit 151, a first and a second audio output unit 152a, 152b, the proximity sensor 141, the illuminance sensor 142, the optical output unit 154, a first and a second cameras 121a, 121b, a first to a third manipulation units 123a, 123b, 123c, the microphone 122, the interface unit 160, and an earphone jack 130.

Hereinafter, as shown in FIGS. 1 and 2, on a front of the terminal body are disposed the display unit 151, the first audio output unit 152a, the proximity sensor 141, the illuminance sensor 142, the optical output unit 154, the first camera 121a, and the first manipulation unit 123a. On a lateral side of the body are disposed the second manipulation unit 123b, the microphone 122, the earphone jack 130, and the interface unit 160. On a rear side of the body are disposed the second audio output unit 152b, the third manipulation unit 123c, and the second camera 121b. The mobile terminal 10, which includes the front side of the body, the lateral side of the body, and the rear side of the body, may be described as an example.

However, these configurations are not limited to this arrangement. These configurations may be excluded or replaced, or disposed on the other side as needed. For example, the front side of the body may not be provided with the first manipulation unit 123a, and the second audio output unit 152b may be provided on not the rear side of the body but the lateral side of the body.

The body BD of the mobile terminal 10 may include a front case 101, a rear case 102 and a rear cover 103. The rear cover 103 may be integrally formed with the rear case 102. The body BD of the mobile terminal 10 may include a front case 101 and a rear case 102.

The display unit 151 displays (or outputs) information processed by the mobile terminal 10. For example, the display unit 151 may display execution screen information of an application program driven by the mobile terminal 10, or UI (User Interface) and GUI (Graphic User Interface) information according to the execution screen information.

The display unit 151 may include at least one of a liquid crystal display (LCD), a thin film transistor-liquid crystal display (TFT LCD), an organic light-emitting diode (OLED), a flexible display, and a 3D display, an e-ink display.

Further, the display unit 151 may be provided two or more depending on the implementation of the mobile terminal 10. In this case, a plurality of display unit may be spaced apart to one surface or may be disposed integrally, may also be disposed on different surfaces respectively in the mobile terminal 10.

The display unit 151 may include a touch sensor for sensing a touch on the display unit 151 to receive a control command. By using this, when a touch is applied to the display unit 151, the touch sensor senses the touch and a controller may generate a control command corresponding to the touch. Information that is input by the touch may be either a letter or a number, and it may be a specified or indicated menu items in the various modes. The controller may be implemented by some electronic components installed in the body BD. For example, the controller may be implemented by some electronic substrates or boards.

Meanwhile, the touch sensor may be configured as a film type having a touch pattern, and may be arranged between a window of the display unit 151 and a display panel on a rear side of the window of the display unit 151, or may be a metal wire patterned directly on the rear surface of the window of the display unit 151. Alternatively, the touch sensor may be formed integrally with the display unit 151. For example, the touch sensor may be disposed on a substrate of the display unit 151, or may be provided in an interior of the display unit 151.

Like this, the display unit 151 may form a touch screen with the touch sensor. In this case, the touch screen may work as the manipulation unit 123a. In some cases, the touch screen may replace at least some functions of the first manipulation unit 123a.

The first audio output unit 152a may be implemented as a receiver for transmitting the other party's voice to an ear of the user. The second audio output unit 152b may be implemented as a loud speaker for outputting various kinds of alarm sounds or playing sounds of multimedia.

The window of the display unit 151 may form a sound hole for the release of a sound generated from the first audio output unit 152a. However, the present invention is not limited to this. The sound may be released along an assembly gap between structures (for example, a gap between the window of the display unit 151 and the front case 101). In this case, since holes formed independently for sound output are apparently invisible or hidden, the external appearance of the mobile terminal 10 may become much simpler.

The optical output unit 154 may output a light to inform an user of an event occurred. The events may be a message reception, a call signal reception, a missed call, an alarm, event notification, e-mail reception, or an information reception via an application. If the user's confirmation of the event is detected, the controller may control the optical output unit 154 to be terminated.

The first camera 121a may include an image sensor for acquiring an image. The first camera 121a may process an image frame of a still image or a moving image obtained by the image sensor in the photographing mode or the video communication mode. The processed image frame may be displayed on the display unit 151 and may be stored in the memory.

The first to third manipulation units 123a, 123b, 123c may be operated to receive commands for controlling the operation of the mobile terminal 10, and may be collectively referred to as manipulating part. The first to third manipulation units 123a, 123b, and 123c may be adopted in any way if the way is touch, push, scroll, etc. as tactile manner that is operated while the user is receiving a tactile feel. Further, the first and second manipulation units 123a, 123b may be adopted also in such a way that is operated without the tactile feel of the user through proximity touch and hovering touch, etc. The third manipulation unit 123c may obtain the user's fingerprints with a fingerprint sensor. The obtained fingerprint information may be provided to the controller.

The first manipulation unit 123a may be a touch key as an example, but the present invention is not limited to this. For example, the first manipulation unit 123a may be a mechanical key, or may be composed of a combination of the touch key and the mechanical key.

The information that is input by the first and second manipulation units 123a, 123b may be variously set. For example, the first manipulation unit 123a may receive commands on menu, home key, maycel, search, etc. The second manipulation unit 123b may receive input commands, such as adjusting volume level of sound outputted from the first or the second audio output unit 152a, 152b, and switching to a touch recognition mode of the display unit 151.

Meanwhile, the rear surface of the terminal body may be provided with the third manipulation unit 123c as another example of the user input unit 123. The third manipulation unit 123c is to be manipulated in order to receive a command for controlling an operation of the mobile terminal 10, and information to be input may be variously set. For example, the third manipulation unit 123c may receive input commands, such as on/off of the power supply, start, end, scroll, etc., adjusting volume level of sound outputted from the first or the second audio output unit 152a, 152b, switching to a touch recognition mode of the display unit 151, and acquisition of fingerprint information. A rear input unit may be implemented in the form of a touch input and a push input, or in the form of a combination thereof.

The rear input unit may be disposed to be overlapped with the display unit 151 of the front surface in a thickness direction of the terminal body. For example, the rear input unit may be disposed on the rear upper end of the terminal body so as to be easily manipulated using an index finger when the user squeezes the terminal body with one hand. However, the present invention is not limited to this, and the location of the rear input unit may be changed.

In case the rear input unit is provided on the rear surface of the terminal body, a new type of user interface may be implemented using this. In addition, in case the first manipulation unit 123a is not disposed on the front surface of the terminal body by replacing at least some functions of the first manipulation unit 123a which is provided on the front surface of the terminal body with the previously described touch screen or the rear input unit, the display unit 151 may be configured in a more large screen.

Meanwhile, the mobile terminal 10 may be provided with a fingerprint recognition sensor to recognize fingerprints of the user, and the controller 180 may use the fingerprint information detected by the fingerprint recognition sensor as an authentication means. The fingerprint recognition sensor may be embedded in the display unit 151 or the user input unit 123.

The microphone 122 may be made to be provided with a user's voice, other sound and so on. The microphone 122 may be provided in a plurality of locations and may be configured to get a stereo sound.

The interface unit 160 may be a passage that may connect the mobile terminal 10 to an external device. For example, the interface unit 160 may be at least one of connection terminals for connection to another device (for example, an earphone, an external speaker), ports for short-range communication [for example, an infrared port (IrDA Port), a Bluetooth port, a wireless LAN Port, etc.], or power supply terminals for supplying power to the mobile terminal 10.

The interface unit 160 may be implemented as a socket for receiving an external card such as a SIM (Subscriber Identification Module) or a UIM (User Identity Module) or a memory card for storing information. For example, as shown in FIG. 1, the interface unit 160 may include a SIM tray 210 and an input-output port 119. The SIM tray 210 may load a SIM card. The SIM tray 210 may be moved to the inside or outside of the mobile terminal 10 for replacement and/or replacement of a SIM card. The input-output port 119 may be a path for electric power to be provided to the mobile terminal 10. The input-output port 119 may be connected to an external terminal or an external electronic device, and may be an input-output path for information and electric signals. The input-output port 119 may be connected to an external terminal. For example, the input-output port 119 may be connected to an external USB terminal. In this case, the input-output port 119 may be referred to as a USB port 119.

The second camera 121b may be disposed on the rear surface of the terminal body. In this case, the second camera 121b may shoot in opposite direction in comparison with the first camera 121a.

The second camera 121b may include a plurality of lenses that are arranged along at least one line. The plurality of lenses may be arranged in matrix form. These cameras may be referred to as 'array camera'. When the second camera 121*b* is configured by an array camera, it is possible to take images in a variety of ways using the plurality of lenses, and to obtain a better quality image.

A flash 124 may be disposed adjacent to the second camera 121*b*. The flash 124 may illuminate light toward an object when the second camera 121*b* is for shooting the object.

The second audio output unit 152*b* may be additionally disposed in the body BD. The second audio output unit 152*b* may implement a stereo function together with the first audio output unit 152*a*, and may be used for the implementation of a speakerphone mode during a call.

The body BD may be provided with at least one antenna for a wireless communication. The antenna may be embedded in the body BD or may be formed on the body BD. For example, an antenna that is part of a broadcast receiving module, may be configured to be drawn out from the body BD. Alternatively, the antenna may be formed in a film type and may be attached to an inner surface of the rear cover 103. A case comprising a conductive material may work as an antenna.

The body BD may be provided with a power supply unit on purpose of supplying an electric power to the mobile terminal 10. The power supply unit may be embedded in the body BD or may include a battery 191 which is detachable.

The battery 191 may be configured to be provided with the electric power via power cable connected to the interface unit 160. Further, the battery 191 may be configured to be charged by using wireless-charger. The wireless charging may be implemented by magnetic induction or resonance manner (magnetic resonance scheme).

Meanwhile, referring to the FIGS. 1 and 2, the rear cover 103 may be coupled to the rear case 102 to cover the battery 191 and may prevent separation of the battery 191 and may protect the battery 191 from an external impact and foreign matter. When the battery 191 is configured to be detachable on the terminal body, the rear cover 103 may be detachably coupled to the rear case 102.

An accessory to protect an appearance of the mobile terminal 10 or to assist or extend a function of the mobile terminal 10 may be added to the mobile terminal 10. An example of the accessory may be a cover to cover at least one surface of the mobile terminal 10 or a pouch to accommodate at least one surface of the mobile terminal 10. The cover or the pouch may be configured to extend the function of the mobile terminal 10 by interacting with the display unit 151. Another example of the accessory may be a touch pen to assist or extend a touch input on the touch screen.

FIG. 3 is an exploded perspective view of the mobile terminal of FIG. 1. The rear case 102 of the mobile terminal 10 may be integrally formed with the rear cover 103 (see FIG. 1). When the rear case 102 is integrally formed with the rear cover 103 (see FIG. 1), at least a part of the rear case 102 may be easily made of metal. When the rear case 102 is integrally formed with the rear cover 103 (see FIG. 1), it may be advantageous in securing the rigidity of the rear case 102.

The front case 101 may be fastened to the rear case 102. Electronic components may be disposed between the front case 101 and the rear case 102. When the front case 101 is fastened to the rear case 102, the electronic parts located inside the mobile terminal 10 may not be exposed to the outside. A battery 191, a main circuit board 181, an acoustic output unit 152*c*, and an earphone jack 130 may be disposed on the rear surface of the front case 101. A third manipulation unit 123*c* capable of obtaining fingerprint information may be connected to the main circuit board 181.

The rear case 102 may provide a space in which the electronic components may be seated. The rear case 102 may form at least a part of the rear surface of the mobile terminal 10. The rear case 102 may form at least a part of the lateral surface of the mobile terminal 10.

The display unit 151 may include a window 151*a* and a display panel 151*b*. A touch circuit board 135 and a display circuit board 131 may be connected to the display panel 151*b*. The display unit 151 may be accommodated in the front case 101. The touch circuit board 135 and the display circuit board 131 may be connected to the main circuit board 181. The battery accommodating part 192 may be formed on the rear surface of the front case 101 and receive the battery 191.

FIGS. 4 and 5 are cross-sectional views of the mobile terminal taken along line A-A' of FIG. 1, illustrating a mobile terminal to which a conventional waterproof member is applied. FIG. 4 illustrates a state in which a conventional waterproof member is applied to the mobile terminal of FIG. 1, and FIG. 5 illustrates a state in which a conventional waterproof member and a button are removed from the mobile terminal of FIG. 4. FIG. 5 can represent the area A in FIG. 4. The second operation unit 123*b* may include a button BTN, a conventional waterproof member WPP, and an existing signal generator MTU.

The button BTN may be located on the side of the mobile terminal 10. The button BTN may be pushed to obtain an input. The mechanical input obtained by the button BTN can be transferred to an existing signal generating unit (MTU) and converted into an electric signal. The outer portion of the conventional button BTN may be located in the button receiving area BTR shown in FIG. 5.

The movement path of the button BTN may be required when the button BTN is pushed. The movement path of the button BTN may have a clearance with the button BTN. The movement path of the button BTN may be a hole formed in the body BD. Liquid or the like may be introduced into the body BD through a hole formed in the body BD. The hole formed in the body BD may be the waterproof member receiving area WPR shown in FIG. 5.

The existing waterproof member (WPP) can be located in the waterproof member receiving area (WPR). The existing waterproof member WPP can be fitted in the waterproof member receiving area WPR to shield the waterproof member receiving area WPR. The conventional waterproof member WPP may be a shape that wraps a part of the button BTN. The conventional waterproof member WPP can be damaged by mechanical abrasion due to the push operation of the button BTN. The conventional waterproof member WPP can provide the frictional force to the button BTN during the pushing operation of the button BTN. The frictional force provided to the button BTN by the existing waterproof member WPP may lower the sense of pushing of the user.

The existing signal generating unit (MTU) may be located in the signal generating unit receiving area FPR shown in FIG. 5. The existing signal generating unit (MTU) can convert the mechanical pressure or force provided by the button BTN into an electric signal. The existing signal generating unit (MTU) may be connected to a separate FPCB to transmit the generated electric signal to the main circuit board 181. In this case, the separate FPCB may consume the internal space of the body BD.

The body BD of the mobile terminal 10 to which the conventional waterproof member WPP is applied includes a body wall WL as a structure capable of withstanding the mechanical pressure or force provided by the signal generating unit MTU can do. The signal generating portion receiving area FPR and the body wall WL may consume the internal space of the body BD.

FIGS. 6 and 7 are cross-sectional views of the mobile terminal of FIG. 1 taken along line A-A', illustrating a mobile terminal to which an input receiving module 500 according to an embodiment of the present invention is applied. FIG. 6 illustrates a state in which the input receiving module 500 according to the embodiment of the present invention is applied to the mobile terminal of FIG. 1, FIG. 7 illustrates a state in which the input receiving module 600 and the button BTN is removed in the mobile terminal of FIG. 6. FIG. 7 illustrates the area B in FIG. 6. The second operation unit 123b may include an input receiving module 500 and a button BTN.

The button BTN may be adjacent to the side surface of the mobile terminal 10. The button BTN may be pushed to obtain an input. The button BTN may be located in the button receiving portion 221 shown in FIG. 7. The mechanical input obtained by the button BTN may be transmitted to the input receiving module 500 and converted into an electrical signal. The movement path of the button BTN may be formed in the button accommodating portion 221.

The input receiving module 500 may include a signal connecting module 300 and an input receiving unit 400. The function of the input receiving unit 400 may correspond to the function of the existing signal generating unit (MTU) shown in FIG. 4. The input receiving unit 400 can convert the mechanical pressure or force provided from the button BTN into an electric signal. The input receiving unit 400 may be located in the button accommodating portion 221. The input receiving unit 400 may have a waterproof function by itself. The input receiving unit 400 may be fixed to the signal connecting module 300. The input receiving unit 400 may be connected to the signal connecting module 300 by soldering or the like.

The signal connection module 300 may be connected to the input receiving unit 400 and connected thereto. The signal connection module 300 may be electrically connected to the input receiving unit 400. The signal connection module 300 can receive an electric signal from the input receiving unit 400. The signal connection module 300 can transmit the provided electric signal to the main circuit board 181. The signal connection module 300 according to an exemplary embodiment of the present invention may not require a separate FPCB to be connected to the main circuit board 181.

The signal connection module 300 may be located in the body hole 223. The signal connection module 300 can shield the body hole 223. The signal connection module 300 may not receive the mechanical pressure from the input receiving unit 400. The signal connection module 300 may be fixed to the body hole 223. The signal connection module 300 may be fixed to the body hole 223 and not move when receiving mechanical pressure from the input receiving unit 400. The body BD of the mobile terminal 10 to which the signal connection module 300 according to an exemplary embodiment of the present invention is applied is configured such that the button BTN is located in an area where the button BTN is not located, may not include a separate structure that is capable of withstanding the mechanical pressure provided by it.

The button receiving portion 221 may have a shape of a hole. The button receiving portion 221 can communicate with the outside. The button receiving portion 221 can receive the button BTN. The button accommodating portion 221 can form a space in which the button BTN moves when the push button is operated. The size of the button accommodating portion 221 may correspond to the size of the button BTN.

The button accommodating portion 221 can accommodate the input receiving unit 400. The size of the button accommodating portion 221 may correspond to the size of the input receiving unit 400. At least a portion of the inner wall of the button receiving portion 221 can withstand at least a portion of the mechanical pressure provided by the input receiving unit 400.

The body hole 223 may have a shape of a hole. The body hole 223 can communicate with the button receiving portion 221. The cross section of the body hole 223 may overlap with the cross section of the button receiving section 221. The cross section of the body hole 223 may be smaller than the cross section of the button receiving portion 221. The shape of the body hole 223 may correspond to the shape of the signal connection module 300.

FIG. 8 is a diagram illustrating the input receiving module of FIG. 6. The input receiving module 500 according to an embodiment of the present invention may include a signal connecting module 300 and an input receiving unit 400. The signal connection module 300 may include a signal connection 310, a housing 330, and a waterproof packing 350. The input receiving unit 400 may include a push contact unit 410 and an input receiving PCB 420.

The push contact portion 410 may be a configuration to which surface mounting technology is applied. The push contact portion 410 may have the shape of a dome. The push contact portion 410 can be provided with the mechanical pressure by the button BTN. When the mechanical pressure by the button BTN is transmitted to the push contact portion 410 and the mechanical pressure by the button BTN is not transmitted to the push contact portion 410, It can have a different shape. At least a portion of the push contact portion 410 may have a restoring force.

The input receiving PCB 420 may be connected to the push contact portion 410. The input receiving PCB 420 may convert the mechanical pressure provided from the push contact portion 420 into an electrical signal. The input receiving PCB 420 may comprise a flexible printed circuit board (FPCB). The input receive PCB 420 may include a structure capable of supporting the FPCB. The input receiving PCB 420 may be attached to the signal connection module 300. The input receiving PCB 420 may be attached to at least one of the signal connection 310 and the housing 330. The input receiving PCB 420 may be electrically connected to the signal connector 310.

FIGS. 9 to 11 are diagrams illustrating the signal connection module of FIG. 8. FIG. 9 and FIG. 10 are views illustrating the signal connection module of FIG. 8 viewed from different directions. FIG. 11 is an exploded perspective view of the signal connection module of FIG. 8. The signal connection module 300 according to an embodiment of the present invention may include a signal connection part 310, a housing 330, and a waterproof packing 350.

The signal connection part 310 may be mounted on one side of the housing 330. The signal connection 310 can be fixed by one side of the housing 330. The signal connection part 310 is enclosed by the housing 330, and both ends can be exposed to the outside. The signal connection unit 310 may electrically connect the first and second signal units connected to both ends. The signal connection part 310 can pass through the body hole 223.

The first signal portion can be disposed on one side of the body (BD) to process electric signals. The first signal portion may be disposed on one side of the body hole 223. For example, the first signal unit may be at least one of a main circuit board 181, a touch circuit board 135, and a display circuit board 131. The second signal portion may be disposed on one side of the body (BD). The second signal portion may be disposed on the other side of the body hole 223. The second signal unit may be, for example, an input receiving unit 400. The body hole 223 may be located between the first signal portion and the second signal portion.

The signal connection unit 310 may be provided in plurality. For example, the signal connection unit 310 may include a first signal connection unit 310a and a second signal connection unit 310b. The first signal connection unit 310a and the second signal connection unit 310b may be spaced apart. The first signal connection unit 310a and the second signal connection unit 310b may be parallel to each other. The first signal connection part 310a and the second signal connection part 310b may be electrically insulated by the housing 330.

The signal connection unit 310 may form a first signal connection terminal 320 and a second signal connection terminal 325. The first signal connection terminal 320 may be formed at one end of the signal connection part 310. The first signal connection terminal 320 may be electrically connected to the first signal unit 181. The second signal connection terminal 325 may be formed at the other end of the signal connection part 310. The second signal connection terminal 325 may be electrically connected to the second signal unit 400.

The first signal connection terminal 320 may be electrically connected by contacting the first signal portion. The first signal connection terminal 320 may have a distance different from that of the first signal portion when the signal connection module 300 moves and changes its position. The second signal connection terminal 320 may be electrically connected to the second signal unit in close contact with the second signal unit.

At least a portion of the signal connection 310 may be conductive. The signal connection part 310 may include a metal. For example, the signal connection 310 may be formed of copper, gold, silver, aluminum, zinc, brass, nickel, iron, and tin.

The signal connection part 310 may include a signal connection part body 311 and a signal connection part bending part 312. The signal connection part bent part 312 may extend from one side of the signal connection part body 311 and may be bent.

The first signal connection part 310a may include a first signal connection part body 311a and a first signal connection part bending part 312a. The second signal connection part 310b may include a second signal connection part body 311b and a second signal connection part bending part 312b.

The housing 330 can fix the signal connection part 310. The housing 330 may include an insulator. The housing 330 may include a dielectric material. The housing 330 can fix the waterproof packing 350. The housing 330 may form a housing body 331, a housing lid 333, a housing recess 335, and a housing hollow 337.

The housing lid 333 may be formed to extend in one direction from the housing body 331. The extending direction of the housing lid 333 may be parallel to the longitudinal direction of the signal connection part 310.

A plurality of housing lids 333 may be provided. For example, the housing lids 333 may include first to third housing lids 333a, 333b, and 333c. The first to third housing lids 333a, 333b, and 333c may be parallel to each other. The first to third housing lids 333a, 333b, 333c may be spaced apart from each other. The second housing lid 333b may be disposed between the first signal connection 310a and the second signal connection 310b.

The housing recess 335 may be formed in the housing body 331. The housing recess 335 may have a concave shape on the outside of the housing body 331. The housing recess 335 can provide a space in which the waterproof packing 350 is seated.

The housing hollow part 337 may be formed in the housing body 331. The housing hollow part 337 may have a shape penetrating from one side of the housing body 331 to the other side. The housing hollow part 337 can receive the signal connection portion 310. The housing hollow part 337 can receive the signal connection body 311.

The housing hollow part 337 may be plural. For example, the housing hollow part 337 may include a first housing hollow part 337a and a second housing hollow part 337b. The first housing hollow part 337a may receive the first signal connection portion 310a. And the second housing hollow part 337b can receive the second signal connection portion 310b.

The housing well 332 may be formed in the housing body 331. The housing well 332 may have a concave shape on the outer surface of the housing body 331. The housing well 332 can communicate with the housing hollow part 337. The housing wells 332 may be provided in plural. For example, the housing well 332 may include a first housing well 332a and a second housing well 332b.

The housing well 332 may receive a portion of the signal connector 310. The housing well 332 can receive the signal connector bend 312. The housing well 332 may be formed corresponding to the shape of the signal connection bending portion 312. When the depth of the housing well 332 corresponds to the thickness of the signal connection bend portion, a step is formed between the outer surface of the housing body 331 and the signal connection bend portion 312, which is in parallel with the extended surface of the signal connection bending portion 312 Can be prevented. In this case, the second signal unit 400 can be easily attached to the signal connection unit 310.

The waterproof packing 350 may be connected to one side of the housing body 331. The waterproof packing (350) can be fitted in the housing recess (335). The waterproof packing (350) can shield the body hole (223). The waterproof packing 350 may have elasticity. The waterproof packing 350 may have an elastic force and/or a restoring force. The waterproof packing 350 may be in close contact with the body hole 223. The waterproof packing 350 can be brought into close contact with the housing body 331.

FIG. 12 is a cross-sectional view of the signal connection module 300 taken along line B-B' in FIG. 9. FIG. 13 is a cross-sectional view of the signal connection module 300 taken along line C-C' of FIG. 9.

FIG. 12 illustrates a cross section including the housing lid 333 in the section of the housing 330. The housing lid 333 may be formed extending from the housing body 331. The direction in which the housing lid 333 extends may be parallel to the longitudinal direction of the signal connection body 311.

The waterproof packing 350 may include a waterproof packing body 351 and a waterproof packing ring 352. The waterproof packing body 351 can be located in the housing recess 335. The waterproof packing body 351 can be brought into close contact with the housing body 331. The waterproof packing ring 352 may be formed along the periphery of the waterproof packing body 351. The waterproof packing ring 352 may extend from the waterproof packing body 351. The waterproof packing ring 352 can be brought into close contact with the body hole 223.

FIG. 13 illustrates a cross-section of the housing 330 including the signal connection 310. A part of the signal connection part 310 may be enclosed by the housing body 331. For example, part of the signal connection body 311 may be enclosed by the housing body 331. A part of the signal connection part 310 may be in contact with or facing the housing lid 333. For example, a surface of the signal connection body 310 may contact or face the housing lid 33.

The signal connection unit 310 may include a plurality of terminals exposed to the outside. The signal connection unit 310 may include a first signal connection terminal 320 and a second signal connection terminal 325. The first signal connection terminal 320 may be spaced apart from the second signal connection terminal 325 when viewed from the outside of the signal connection module 300.

The first signal connection terminal 320 may include a plurality of exposed surfaces. For example, the first signal connection terminal 320 may include a first surface 321, a second surface 322, and a third surface 323 of the signal connection body 311. The first signal connection terminal 320 may be electrically connected to the first signal unit 181. At least one of the first surface 321, the second surface 322 and the third surface 323 of the signal connection body 311 may be electrically connected to the first signal portion 181.

The second signal connection terminal 325 may include a first surface 326 and a second surface 327 of the signal connection bending portion 312. The second signal connection terminal 325 may be electrically connected to the second signal unit 400. At least one of the first surface 326 and the second surface 327 of the signal connection bending portion 312 may be electrically connected to the second signal portion 400. The first surface 326 of the signal connection bending portion 312 may have a wider contact surface than the second surface 327 of the signal connection bending portion 312 so that it may be advantageous to connect the second signal portion 400.

The second signal connection terminal 325 or the signal connection bending portion 312 may form a step STP with the housing body 331. The step STP may indicate the extent to which the signal connection bending portion 312 protrudes from the outer surface of the housing body 331. That is, the second signal connection terminal 325 or the signal connection bending portion 312 can form the protrusion PRT.

The protrusion PRT may function as a stopper when the signal connection module 300 is inserted into the body hole 223. That is, the protrusion PRT can prevent the signal connection module 300 from moving from the outside to the inside in a state where the signal connection module 300 is fitted in the body hole 223. A shape corresponding to the protrusion PRT may be formed adjacent to the entrance of the body hole 223.

FIG. 14 is a diagram illustrating a state in which the signal connection module 300 of FIG. 6 is electrically connected to the first signal portion 181. As shown in the figure, the first signal unit 181 may include a main circuit board 181. The first signal portion 181 may include a PCB connecting member 182.

The PCB connecting member 182 can connect the first signal unit 181 and the signal connection module 300. The PCB connecting member 182 may be conductive. The PCB connecting member 182 may have an elastic force and/or a restoring force. The PCB connecting member 182 can be in contact with the first signal connecting terminal 320. The PCB connecting member 182 may be in contact with the third surface 323 of the signal connecting body 311. Although not shown in the drawings, the PCB connecting member 182 can be in contact with the first surface 321 or the second surface 322 of the signal connection body 311.

A stopper region STR may be formed adjacent to the body hole 223. The stopper area STR may be formed corresponding to the protrusion PRT of the signal connector 310. The stopper area STR may be formed corresponding to the step STP formed by the signal connector bending part 312 with respect to the housing body 311. The stopper area STR can prevent the signal connection module 300 from moving from the outside to the inside of the body BD in a state where the signal connection module 300 is disposed in the body hole 223.

FIG. 15 is a view illustrating a state in which the signal connection module 300 and the antenna unit 600 are connected. The antenna unit 600 may be combined with the signal connection module 300 to form the antenna module 700. The antenna unit 600 may include an antenna transmission/reception unit 610 and an antenna connection unit 620. The second signal unit 600 connected to the signal connection module 300 may be the antenna unit 600.

The signal connection module 300 may be electrically connected to the antenna unit 600. The second signal connection terminal 325 of the signal connection module 300 may be electrically connected to the antenna unit 600. The signal connection module 300 can receive an electric signal from the first signal unit 181 and transmit the electric signal to the antenna unit 600.

The antenna connection unit 620 can electrically connect the signal connection module 300 and the antenna transmission/reception unit 610. The antenna connection unit 620 may be electrically connected to the second signal connection terminal 325 of the signal connection module 300. The antenna connection unit 620 can transmit an electric signal from the signal connection module 300 to the antenna transmission/reception unit 610. The antenna connection unit 620 can transmit an electric signal from the antenna transmission/reception unit 610 to the signal connection module 300.

The antenna connection portion 620 may be a metallic gasket. The antenna connection 620 may be an adhesive or bonding material having electrical conductivity. The antenna connection unit 620 can fix the antenna transmission/reception unit 610 to the body BD.

The antenna transmission/reception unit 610 may be formed on one side of the body BD. For example, the antenna transmission/reception unit 610 may be disposed inside the body (BD). For example, as shown in FIG. 15, the antenna transmission/reception unit 610 may be a part of a metal case of the body BD. The antenna transceiver 610 may receive an electrical signal from the antenna connector 620 and convert it into an electromagnetic wave and radiate it to the outside of the mobile terminal 10. The antenna transceiver 610 may receive an electromagnetic wave from the outside, convert it into an electric signal, and provide it to the antenna connector 620.

The foregoing embodiments are merely and are not to be considered as limiting the present invention. The present teachings may be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal, comprising:
a body having a hole shaped body hole;
a display unit disposed on a front surface of the body;
a first signal unit located at one side of the body hole and processing an electric signal;
a second signal unit located on the other side of the body hole; and
a signal connection module disposed in the body hole to shield the body hole and electrically connect the first signal unit and the second signal unit,
wherein the signal connection module comprises:
a signal connection unit electrically connecting the first signal unit and the second signal unit;
a housing disposed in the body hole to surround and support at least part of the signal connection unit; and
a waterproof packing mounted on one side of the housing to shield the body hole.

2. The mobile terminal of claim 1,
wherein the signal connection unit is provided in plurality,
wherein the plurality of signal connection units are electrically insulated by the housing.

3. The mobile terminal of claim 1, wherein the housing includes:
a housing body, at least a portion of the housing body being electrically non-conductive; and
a housing lid extending in one direction from one side of the housing body.

4. The mobile terminal of claim 3,
wherein the housing lid is formed of a plurality of but spaced apart from each other,
wherein the signal connection unit is located between two adjacent housing lids of the plurality of housing lids.

5. The mobile terminal of claim 3,
wherein the signal connection unit includes:
a signal connection body; and
a signal connection bending part extending from one side of the signal connection unit body and formed to be bent.

6. The mobile terminal of claim 5,
wherein the housing further comprises a housing hollow having a hole shape and formed at one side of the housing body to accommodate a part of the signal connection body.

7. The mobile terminal of claim 6,
wherein the housing further comprises a housing well formed in a concave shape on an outer surface of the housing body adjacent to the signal connection bending part and communicating with the housing hollow part to accommodate a part of the signal connection bending part.

8. The mobile terminal of claim 7,
wherein the housing well has a depth corresponding to the thickness of the signal connection bending part.

9. The mobile terminal of claim 7,
wherein the signal connection bending part comprises a protruding part protruding from the outer side surface of the housing body in an extending direction of the signal connection bending part.

10. The mobile terminal of claim 9,
wherein the body forms a stopper region having a concave shape corresponding to the shape of the protruding part, the stopper region being adjacent to the body hole.

11. The mobile terminal of claim 5,
wherein the signal connection body forms a first signal connection terminal electrically connected to the first signal unit on one side of the signal connection body,
wherein the first signal connection terminal forms a plurality of surfaces exposed to the outside,
wherein the signal connection bending part forms a second signal connection terminal electrically connected to the second signal unit on one side of the signal connection bending part,
wherein the second signal connection terminal forms a plurality of surfaces exposed to the outside.

12. The mobile terminal of claim 5,
wherein the first signal connection terminal is contacted to the first signal unit and is electrically connected to the first signal unit,
wherein the second signal connection terminal is fixed to the second signal unit and is electrically connected to the second signal unit.

13. The mobile terminal of claim 1,
wherein the first signal unit comprises at least one of a main circuit board, a touch circuit board, and a display circuit board.

14. The mobile terminal of claim 1,
wherein the second signal unit is at least one of an input receiving unit and an antenna unit.

15. The mobile terminal of claim 14,
wherein the antenna unit comprises;
an antenna transceiver forming form at least part of an outer surface of the body, and converting an electric signal and an electromagnetic wave into each other, and
an antenna connection unit connecting the antenna transceiver and the signal connection unit.

* * * * *